(12) United States Patent
Heien

(10) Patent No.: US 6,570,609 B1
(45) Date of Patent: May 27, 2003

(54) METHOD AND APPARATUS FOR MONITORING OPERATION OF A MOTOR VEHICLE

(76) Inventor: Troy A. Heien, 5704 S. View Rd., Laramie, WY (US) 82070

( * ) Notice: Subject to any disclaimer, the term of this patent is extended or adjusted under 35 U.S.C. 154(b) by 0 days.

(21) Appl. No.: 09/556,186

(22) Filed: Apr. 21, 2000

Related U.S. Application Data

(60) Provisional application No. 60/130,484, filed on Apr. 22, 1999.

(51) Int. Cl.[7] .................................................. H04N 7/18

(52) U.S. Cl. ........................ 348/148; 348/153; 348/155; 360/5; 386/92; 701/35

(58) Field of Search ................................. 348/148, 153, 348/155; 360/5; 386/92; 701/35

(56) References Cited

U.S. PATENT DOCUMENTS

| | | | | |
|---|---|---|---|---|
| 5,670,935 A | * | 9/1997 | Schofield et al. | 348/148 |
| 6,167,186 A | * | 12/2000 | Kawasaki et al. | 360/5 |
| 6,266,588 B1 | * | 7/2001 | McClellan et al. | 701/35 |

* cited by examiner

*Primary Examiner*—Howard Britton
(74) *Attorney, Agent, or Firm*—Roland H. Shubert

(57) ABSTRACT

A method and apparatus for monitoring the operation of a motor vehicle for the purposes of determining causation and fault in the event of an accident, and to enhance physical security of the vehicle utilizes electronic digital cameras strategically placed to obtain sequential images of the area immediately adjacent the exterior, and optionally the interior, of the vehicle and to record those images in an electronic memory. A command module controls operation of the cameras and changes the camera mode of operation in the event of an impact or rapid inertial change that signals a collision or other traumatic event.

19 Claims, 6 Drawing Sheets

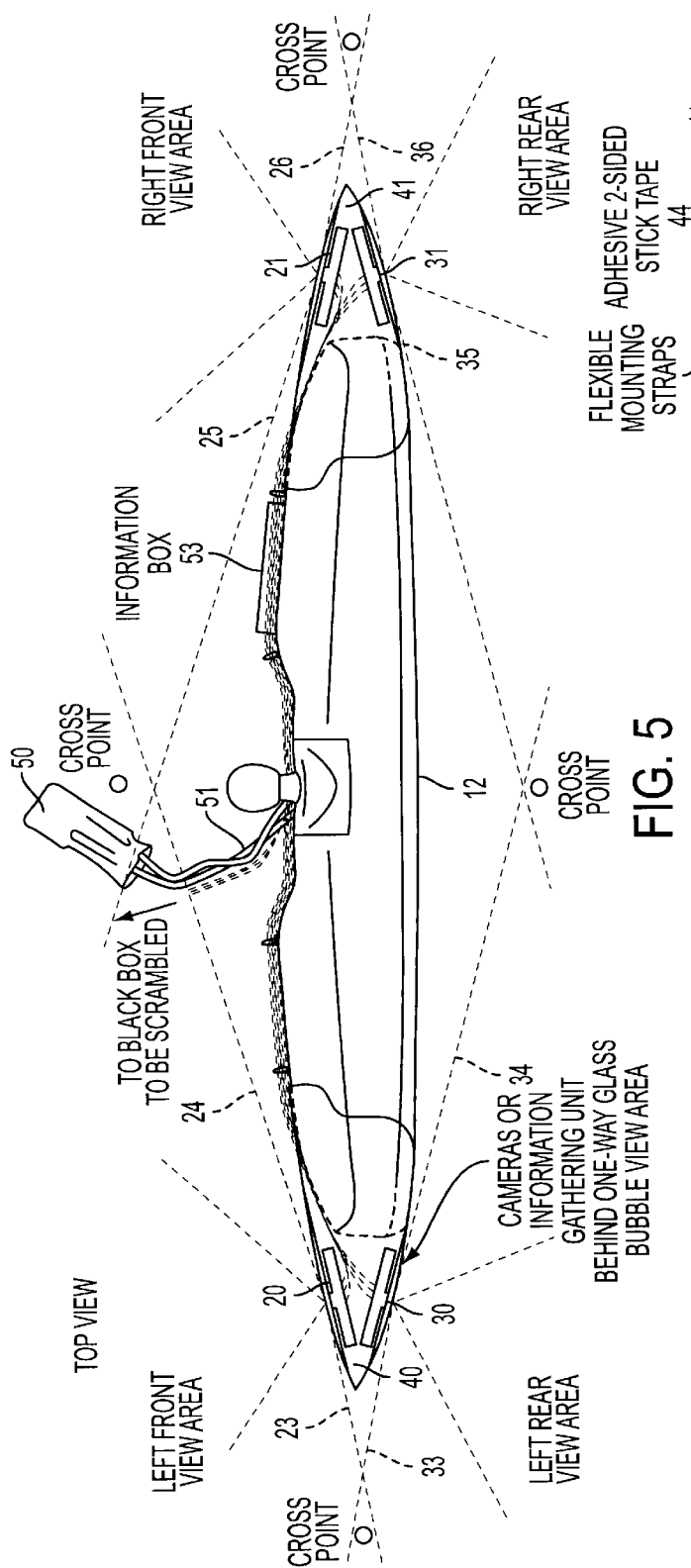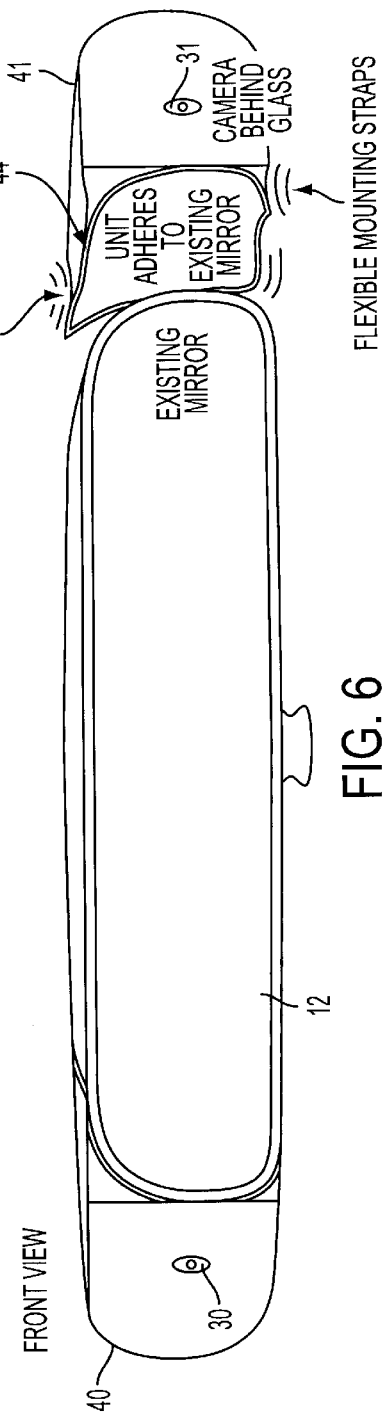

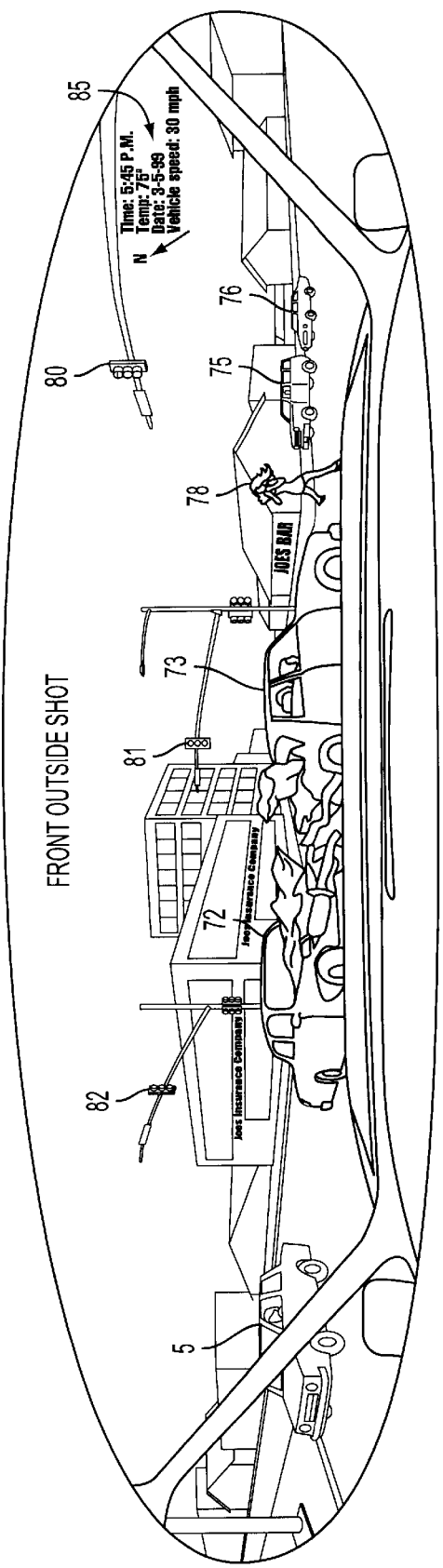

METHOD AND APPARATUS FOR MONITORING OPERATION OF A MOTOR VEHICLE

This application claims the benefit of Provisional Application No. 60/130,484, filed Apr. 22, 1999.

BACKGROUND OF THE INVENTION

1. Technical Field

This invention relates generally to a method and apparatus to record events encountered by a motor vehicle during a revolving time period.

More specifically, this invention relates to an apparatus for recording images that provide views of the interior and exterior of a motor vehicle on a continuous or periodic basis, and to a method for controlling that apparatus to provide an image record of an accident or other occurrence of interest to the motor vehicle operator.

2. Background Art

It is known to provide motor vehicles, particularly commercial trucks, with means that monitor and continuously record selected operational parameters such as vehicle speed, engine rpm, and the like. It is also known to mount video cameras within the passenger compartment of a motor vehicle for the purpose of recording events external to the vehicle, as for example, in traffic law enforcement efforts by police. The video record so produced often is augmented by data that is input from other sources including, for example, the time and date that the video images were created.

Such monitoring techniques and apparatus are useful for their intended purposes but are inadequate to obtain and preserve a record of events such as, for example, involvement of the vehicle in an accident or an attempted theft. Further, sorting out causation and fault in the event of an accident is often difficult and uncertain as it must rely upon whatever physical evidence that is left at the accident scene and the often biased testimony of witnesses to the event. This invention provides a means for obtaining and preserving an accurate and unbiased record of an accident or other event affecting the vehicle.

SUMMARY OF THE INVENTION

This invention provides an apparatus for obtaining and recording images of the exterior and interior of a motor vehicle during its operation and while it is parked, and to a method for using that apparatus to allow a determination of causation or fault in the event of an accident or other significant event. The apparatus can also be used to detect and record any threat to the vehicle, such as attempted theft or vandalism, while the vehicle is parked. The apparatus includes one or more systems having means to produce images and to store those images in a retrievable form. Each system comprises one or more strategically located sensor arrays which are placed to obtain sequential images of the area immediately in front and to the rear of the motor vehicle and, optionally, the interior of the vehicle as well. In a preferred embodiment, the sensors suitably may be a plurality of digital cameras under the control of a command module that provides storage of the images so obtained. Retrieval of the stored images provides a visual history of recently occurring events involving the vehicle.

BRIEF DESCRIPTION OF THE DRAWING

FIG. 5 is a top view of a first sensor array that is mounted upon an automobile rear view mirror;

FIG. 6 is a partially broken away, front view of the sensor array of FIG. 5;

FIG. 10 is a depiction of an image obtained by the first sensor array showing objects and activities in front of the automobile;

DETAILED DESCRIPTION OF THE INVENTION

Figure 1:
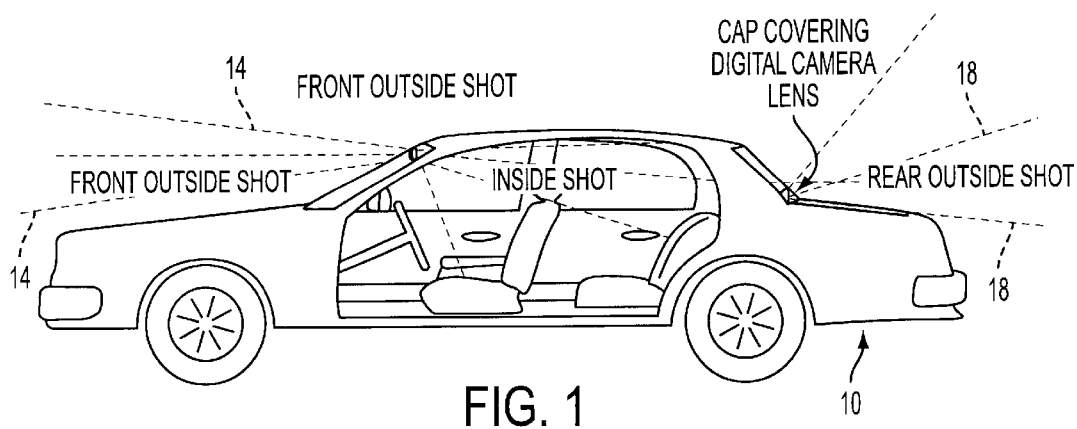
FIG. 1 is a partially cut away side view of an automobile showing the position of the sensors used for the purposes of this invention.
Figure 2:
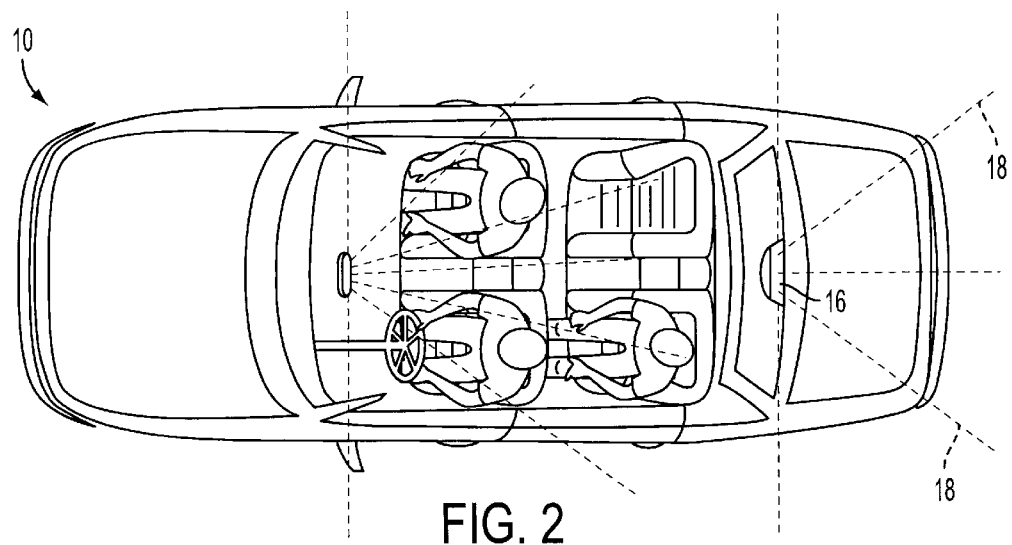
FIG. 2 is a partially cut away top view of the automobile of FIG. 1.
Figure 3:
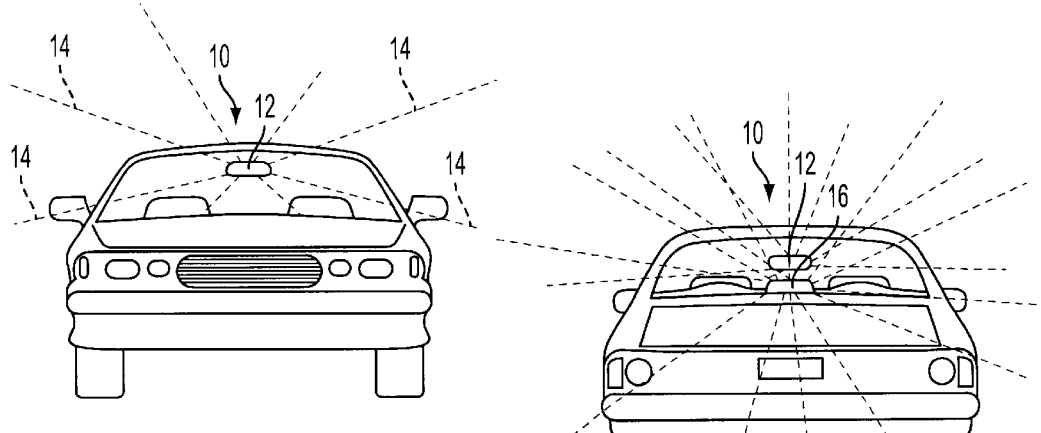
FIG. 3 is a front view of the automobile of FIG. 1.
Figure 4:
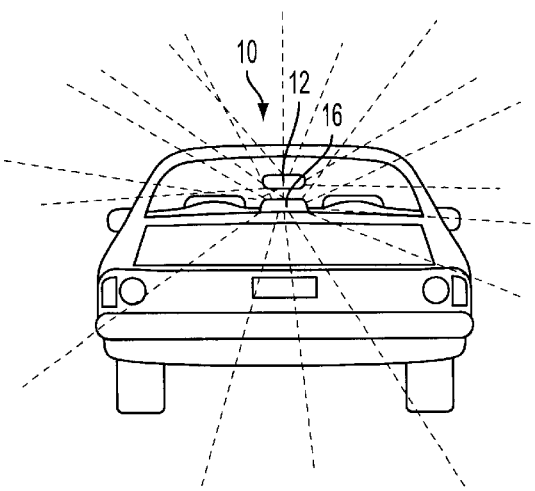
FIG. 4 is a rear view of the automobile of FIG. 1.

This invention comprises systems and techniques for obtaining and recording images that allow the owner or insurer of a motor vehicle to establish the cause of an accident or other source of damage or threat to the vehicle as well as to establish responsibility or fault for events leading up to the accident or threat. That is accomplished through use of strategically placed means that are adapted to produce images and to store those images in a retrievable form. Such means may suitably comprise sensor arrays that are arranged to obtain a wide angle view of the area in front of and to the rear of the vehicle, and preferably of the vehicle interior as well. Images of the viewed areas are suitably obtained using optical sensors that produce a digital image that can be stored within a memory means and retrieved therefrom.

Referring now to the drawings, FIGS. 1–4 are various views of an automobile 10 having the monitoring means of this invention installed therein. A first sensor array is mounted at a location where it commands an essentially unobstructed view of the interior and the front exterior of the automobile, suitably as an attachment to the interior rear view mirror 12 of the automobile. The field of view commanded by the first sensor array is depicted by means of rays 14 projected from the sensor location on mirror 12. A second sensor array is mounted at a location where it commands an essentially unobstructed view of the rear exterior of the automobile. A suitable location for the second sensor array may be as an attachment to a centrally located, rear brake indicator light 16. The field of view commanded by the second sensor array is depicted by means of rays 18 that are projected from the sensor location atop the rear brake indicator light 16.

The arrangement of the first sensor means, as attached to rear view mirror 12, is shown in FIGS. 5 and 6. That first sensor means includes a first pair of front viewing digital cameras 20 and 21 pointed to command a wide angle view, preferably approaching 180°, of the area immediately in front or the automobile. Rays 23 and 24 projecting from digital camera 20 define the field of view of that camera, while rays 25 and 26 projecting from digital camera 21 define its field of view. A second pair of rear pointing digital cameras 30 and 31 may also be included within the first sensor means. Those cameras are pointed to command a full view of the automobile interior. Rays 33 and 34 projecting from digital camera 30 define its field of view while rays 35 and 36 define the field of view for camera 31.

In a preferred embodiment, cameras 20 and 30 are fixed within a housing 40 that attaches to one end of the automobile rear view mirror 12. Cameras 21 and 31 are similarly mounted in another housing 41 that attaches to the other end of mirror 12. The housings 40 and 41 may conveniently be adhesively attached to the mirror back using adhesive tape 44. The cameras making up the first sensor array are controlled by signals generated by command module 50 which is operably connected to the sensor through cable means 51. Supplemental information derived from information box 53 may also be incorporated within each digital image produced by the cameras of the first sensor means. That supplemental information may comprise a time and date stamp, vehicle speed, temperature, compass marking, and other information of a similar nature.

Supplemental information from a separate source may also be included in the image. Such separate supplemental information may usefully comprise location data from a ground positioning satellite system, and the information may be recorded as part of the image either as geographic coordinates or as a street or highway address.

Figure 7:
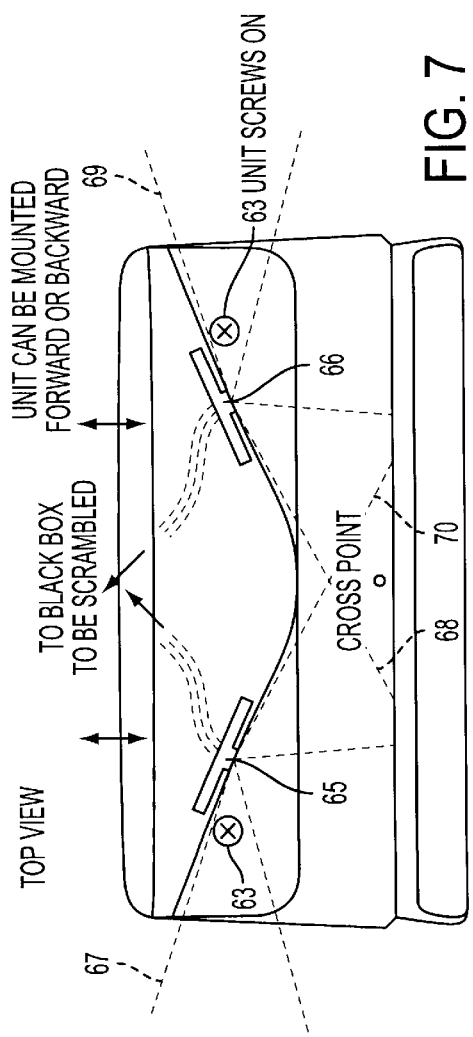
FIG. 7 depicts a second sensor array that is mounted atop a rear stop light of an automobile.
Figure 9:
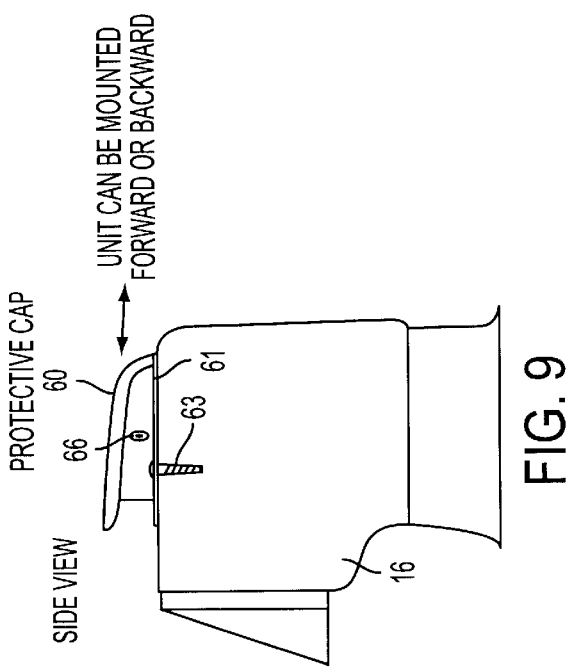
FIG. 9 is a side view of the sensor array of FIG. 7.
Figure 8:
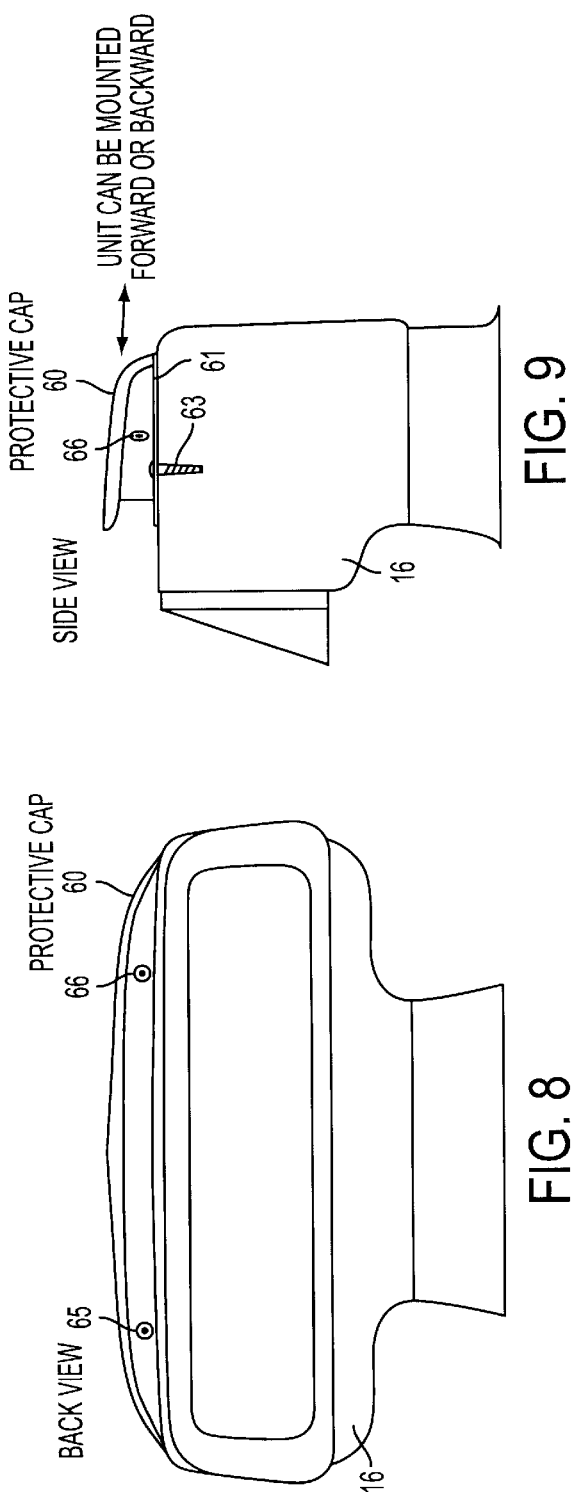
FIG. 8 shows a rear view of the sensor array of FIG. 7.

A second sensor array is mounted at a location whereat it commands an essentially unobstructed view of the exterior rear of the vehicle, suitably as an attachment to the central brake indicator light 16 as is detailed in FIGS. 7–9. Referring now to those Figures, the second sensor array includes a housing having a cap 60 and a base 61 that is mounted upon brake indicator light 16, suitably by screw means 53. The second sensor array includes a pair of digital cameras 65 and 66 that are pointed to the automobile rear. Rays 67 and 68 projecting from digital camera 65 define its field of view while rays 69 and 70 define the field of view for camera 66. It is also feasible to enhance the capability of the system during hours of darkness by incorporating a rearwardly directed strobe synchronized with the camera exposures to supplement the available light in much the same manner as a photographic flash. Such a strobe lamp may be incorporated within the lights conventionally located at the vehicle rear, or a separate strobe lamp may be provided.

In a preferred mode of system operation, the cameras of the first and second sensor means continuously produce single frame images at shortly spaced intervals. Each image that is produced is transmitted to the command module 50 where it is stored in an electronic memory. The storage capacity of the command module memory is limited, and so it is arranged to hold a preselected number of images. Thereafter module 50 continuously erases the oldest image, replacing it with the newest until the system is shut down. In that way, the memory of command module 50 always contains the most recent series of images of the external and internal events encountered by the vehicle. Module 50 is also arranged with means that allow the stored images to be retrieved for external display, thus providing a visual history of the last events recorded by the sensors or cameras.

It is also preferred that command module 50 include an event sensor that may be either of the inertial or impact type (not separately shown). Inclusion of such a sensor within the system of this invention is useful both in the event of an accident involving the vehicle, and also to afford an increased level of physical security for the vehicle. Command module 50 is programmed to differently control the various cameras included within the first and second sensing means when it receives a signal from the event sensor that indicates an impact or inertial change caused by an accident. Upon receiving such a signal, command module 50 may cause the cameras within the sensing means to produce an essentially continuous, or real time, photo record until the command module memory is full so as to obtain an evidentiary record. It is preferred as well that a number of the timed images that were produced before the impact signal be retained within the memory and not recorded over so as to include within the evidentiary record a history of the events that occurred just prior to the accident. Those prior images are very useful in reconstructing the sequence of events that caused the accident to thereby determine responsibility for the accident.

The event sensor may advantageously be provided with a multi-level sensitivity, one setting requiring a fairly severe impact or inertial change in order to produce a signal for the command module, and another setting that is much more sensitive. The first, less sensitive, setting normally is used while the motor vehicle is in motion as the triggering event that produces the evidentiary record is an impact, a panic stop, or a collision. The second, more sensitive setting is used when the vehicle is parked or at rest, or when the key is off or out of the ignition. Triggering of the event sensor causes the cameras to produce and record images for a short, predetermined length of time. The triggering event that produces the evidentiary record in this second case is typically the impact of a shopping cart, a door banger, vandalism, an attempted break-in or theft, and other similar events. It is also desirable to provide for manual activation of the system to produce an evidentiary record, as for example, to record an accident involving other vehicles or to document the overly aggressive or dangerous behavior of other drivers.

Figure 11:
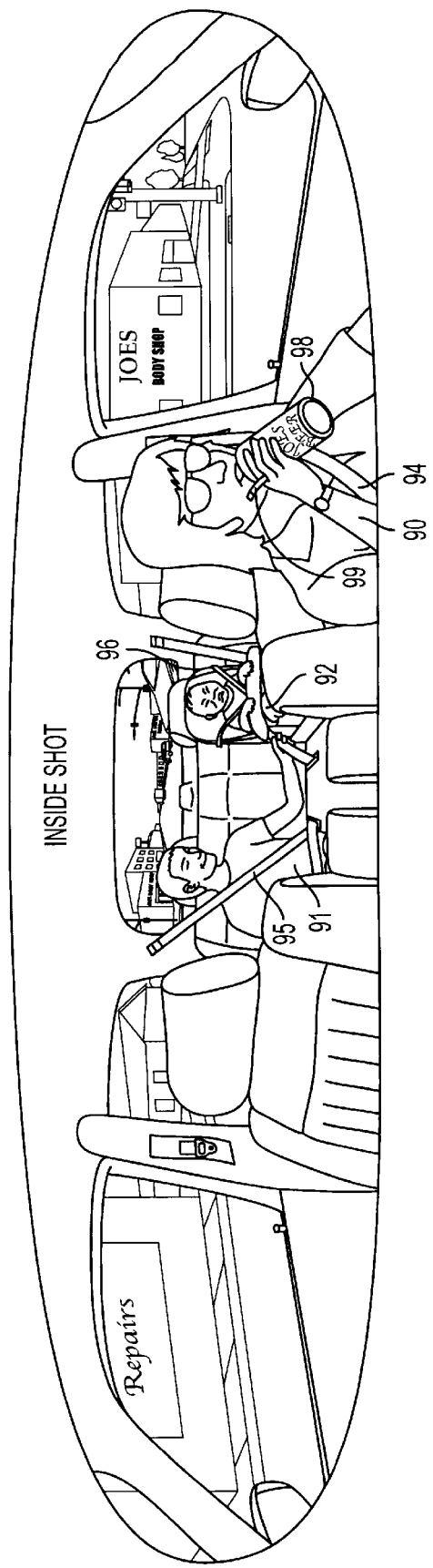
FIG. 11 depicts an image of the automobile interior obtained by the first sensor array.
Figure 12:
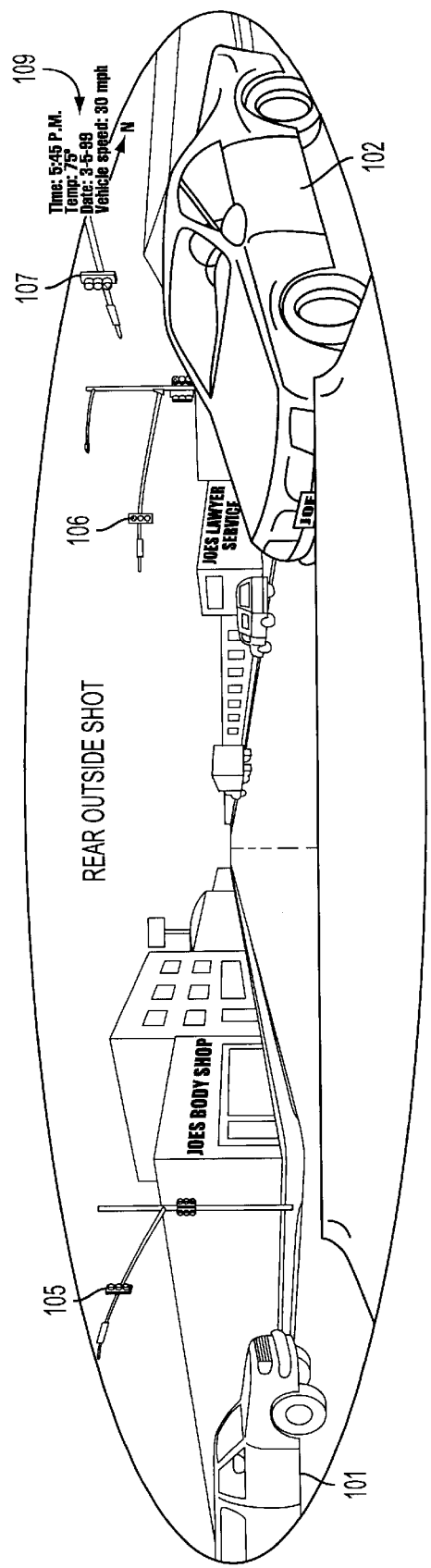
FIG. 12 is an image to the rear of the automobile obtained by the second sensor array.

FIGS. 10, 11 and 12 illustrate the style of images that are obtained from an accident scene through use of the system and techniques of this invention. FIG. 10 is a front exterior image from cameras 20 and 21 of an accident scene that does not directly involve the automobile from which the images were obtained. This image shows a first auto 72 that is involved in a collision with a second auto 73. The position of other autos, 74, 75 and 76, relative to the accident scene is clearly defined. A clear view of the fronts of autos 74, 75 and 76 is shown, possibly even allowing determination of the license numbers of those autos by image enhancement so that potential witnesses can be identified. Likewise, the location of a pedestrian 78 at the time of the collision is clearly defined. Traffic lights 80, 81 and 82 are visible to thereby define the right of way at the time of the collision. Cleanliness of the auto glass may be inferred from the image quality, and any visual obstructions such as ice or snow will also be evident because the image was taken through the windshield. An information stamp 85 that provides the date, time, temperature, vehicle speed, and a true north compass marking is also incorporated in the image.

FIG. 11 is an image of the interior of the same automobile equipped with the inventive system and taken contemporaneously by cameras 30 and 31 with that image of FIG. 10. The displayed image clearly identifies the driver 90, a rear seat passenger 91, and an infant 92. The seat belt 94 of the driver was in place as was the seat belt 95 of the passenger, while the infant was properly secured in a child's seat 96. It shows as well that the driver was holding a can of beer 98 and a cigarette 99 at the time that the image was obtained. An image of the automobile interior can thus provide information relevant to an accident investigation including, for example, who was driving, whether the driver was distracted or inattentive, the identity and seating arrangement of passengers, whether the driver and passengers were wearing seat belts, whether controlled substances were in evidence, and other circumstances of a similar nature.

FIG. 12 displays a rear exterior image taken contemporaneously by cameras 65 and 66 with the images of FIGS. 10 and 11. The displayed image shows a first automobile 101 approaching the intersection and a second automobile 102 entering the intersection. Traffic signals 105, 106 and 107 are clearly visible, thus allowing determination of the right of way. An information stamp 109 provides the date, time, temperature, vehicle speed, and a true north compass marking incorporated into the image.

Taken together, the information provided by these images allows the objective resolution of a number of factual inquiries. Those inquiries may include, for example, a determination of who hit who and at what angle, which car had the right of way, the identity of potential witnesses, weather conditions prevailing at the time of the accident, whether drinking or the use of other controlled substances may have been a factor, and other circumstances which may have contributed to the accident.

A study of sequential images taken during a collision by an automobile having the system of this invention installed therein may also provide other useful information. For example, it may allow a performance evaluation of the safety features built into the automobile. It may whether restraint systems such as air bags, seat belts and child safety seats functioned properly. It may also allow an evaluation of the design integrity of the automobile itself.

While this invention has been described in relation to a preferred embodiment for use in a passenger automobile, the system described herein is expected to find similar use with commercial vehicles including trucks, buses and taxis. In some instances the system of this invention provides unique advantages to the operator of a commercial vehicle. For example, this system provides taxi drivers operating in high crime areas with the ability to monitor and to record the behavior of passengers, thus reducing the dangers of robbery or fare loss.

I claim:

1. Apparatus for monitoring a motor vehicle comprising:
   first imaging means to continually produce at spaced time intervals single frame images of the exterior area immediately in front of said motor vehicle;
   second imaging means to continually produce at spaced time intervals single frame images of the exterior area immediately to the rear of said motor vehicle; and
   storage means arranged to accept said images from said imaging means and to allow retrieval of said stored images for external viewing, said storage means organized such that, when filled to capacity, the oldest image is erased and replaced with the newest, whereby a visual record of the last recorded events may be obtained.

2. The apparatus of claim 1 including third imaging means to continuously produce at spaced time intervals single frame images of the interior of said motor vehicle, and to transmit said images to the storage means.

3. The apparatus of claim 2 wherein each of said first, second and third imaging means comprises a digital camera.

4. The apparatus of claim 1 including means to incorporate supplemental information relevant to the operation of the motor vehicle within each image produced by said imaging means.

5. The apparatus of claim 4 wherein said supplemental information includes at least the time and date at which the image was created.

6. The apparatus of claim 5 including means to record location data either as geographic coordinates or as a street address.

7. The apparatus of claim 1 including an event sensor that, upon being triggered by an inertial change or impact, modifies operation of said imaging means.

8. The apparatus of claim 7 wherein the sensitivity of said event sensor is adjustable between at least two settings, a first setting requiring a greater impact or inertial change to trigger said sensor than does a second setting.

9. The apparatus of claim 8 wherein said event sensor when at said first setting is triggered by an impact or a panic stop and is used while said motor vehicle is in operation.

10. The apparatus of claim 9 wherein said event sensor when at said second setting is triggered by a minor blow to the exterior of said vehicle.

11. The apparatus of claim 10 including means to activate said event sensor at its second setting when the vehicle ignition key is in the off position, and wherein a triggering of said sensor causes said imaging means to produce images for a short, predetermined length of time.

12. A method for producing an evidentiary record of the operation of a motor vehicle comprising:
   continually producing single frame images of the exterior area in front of said motor vehicle at spaced time intervals;
   continually producing single frame images of the exterior area to the rear of said motor vehicle at spaced time intervals;
   providing storage of limited capacity for said images, the newest produced image continually replacing the oldest; and
   retrieving said stored images to obtain a visual record of the last recorded events exterior to said vehicle.

13. The method of claim 12 wherein supplemental information from an external source is superimposed upon each said image, said supplemental information selected from or including all of the group consisting of time, date, vehicle speed, temperature, compass heading, and location data.

14. The method of claim 13 including continually producing single frame images of the interior of said motor vehicle, and storing said images with the images of the vehicle exterior.

15. The method of claim 12 wherein control of the production of said images is also responsive to the output from an event sensor, said event sensor adapted to produce a triggering signal in response to an impact to the vehicle or inertial change caused by panic braking, said triggering signal causing an increase in the rate at which said single frame images are produced.

16. The method of claim 15 wherein the sensitivity of said event sensor is adjustable between at least two settings, a first setting such that the sensor produces a triggering signal upon impact or panic stop, and a second more sensitive setting such that the sensor produces a triggering signal upon a minor blow or impact to the vehicle exterior.

17. The method of claim 16 wherein said first setting of the sensor is used during operation of the vehicle, and wherein said second setting of the sensor is used while the vehicle ignition is off.

18. The method of claim 17 wherein the triggering signal produced at said second sensitivity setting of the sensor causes images of the vehicle exterior to be produced for a predetermined short time thereafter.

19. The method of claim 12 wherein said images are digitally produced and digitally stored.

* * * * *